United States Patent [19]

Ziegler et al.

[11] Patent Number: 4,916,643
[45] Date of Patent: Apr. 10, 1990

[54] SYSTEM FOR REMOTE SENSING OF A PHYSICAL PARAMETER

[75] Inventors: Horst Ziegler; Christof Hoentzsch, both of Paderborn, Fed. Rep. of Germany

[73] Assignee: W.C. Heraeus GmbH, Hanau, Fed. Rep. of Germany

[21] Appl. No.: 143,567

[22] Filed: Jan. 13, 1988

[30] Foreign Application Priority Data

Jan. 16, 1987 [DE] Fed. Rep. of Germany ....... 3701082

[51] Int. Cl.$^4$ .......................... G08C 19/12; G01B 7/26
[52] U.S. Cl. ..................................... 364/557; 364/550; 340/870.17; 374/100; 374/166
[58] Field of Search .................. 364/557, 550, 551.01, 364/578, 505; 340/870.17, 870.18, 870.19, 870.23, 870.24, 500, 501; 374/100, 110, 101, 106

[56] References Cited

U.S. PATENT DOCUMENTS

| | | | |
|---|---|---|---|
| 4,440,509 | 4/1984 | Agarwal | 374/166 |
| 4,441,107 | 4/1984 | Charborski et al. | 340/870.17 |
| 4,471,354 | 9/1984 | Smith | 340/870.17 |
| 4,481,596 | 11/1984 | Townzen | 364/557 |
| 4,483,631 | 11/1984 | Kydd | 364/557 |
| 4,531,193 | 7/1985 | Yasuhara et al. | 364/550 |
| 4,575,806 | 3/1986 | Aldrich et al. | 364/557 |
| 4,669,049 | 5/1987 | Kosednar et al. | 374/100 |
| 4,726,226 | 2/1988 | Tellerman | 340/870.19 |

FOREIGN PATENT DOCUMENTS 3128706 11/1985 Fed. Rep. of Germany.

OTHER PUBLICATIONS

Heraeus brochure PTM-Q1,2C 11.86/VN Ko, The Completely Digital Temp. Meas. System, pp. 4–8.
Heraeus brochure PTM-NQ1, PTM-N-NQ1.9.87, Quat® Laborset.

Primary Examiner—Parshotam S. Lall
Assistant Examiner—Christopher L. Makay
Attorney, Agent, or Firm—Frishauf, Holtz, Goodman & Woodward

[57] ABSTRACT

A temperature remote-measurement system features a central evaluation unit 10 for all measuring points connected to two conductors 12, 14, forming a main data bus. In the embodiment shown, three addressable bus switches 18-1, 18-2, and 18-3 are connected to the data bus. To each bus switch 18 are connected respective conductors 26, 28. These together form an auxiliary bus, which is either connected to, or disconnected from, the main data bus formed by conductors 12, 14, depending upon the position of breaker 20. To the auxiliary buses formed by conductors 26, 28 are connected sensing units 32-38, which can modulate (as measurement pulses) the current carried by the conductors 26, 28 and which respond to specific voltage pulses (control pulses) generated by the control unit 10 and carried over these conductors. Each of the sensing units 32-28 has a temperature sensor 39, a pulse generator 40 controlled by the frequency of the sensor output signal, and a switching stage 41 activated by the sensor signal, so that the sensing unit altogether generates a sequence of pulses, whose interval represents the temperature at the sensing unit. The system also includes a modulator 58 which uses at least one of pulse width modulation and pulse amplitude modulation.

15 Claims, 5 Drawing Sheets

SYSTEM FOR REMOTE SENSING OF A PHYSICAL PARAMETER

Cross-reference to related patent, the disclosure of which is hereby incorporated by reference:

German Patent DE-PS 31 28 706, filed July 21, 1981, issued Nov. 14, 1985, Dr. Prof. Horst Ziegler, entitled "Fuhleinheit und Anlage zur Fernmessung des Warmeverbrauches an einer Mehrzahl von Verbrauchsstellen" [Sensing Unit and Installation for Remote Measurement of Heat Consumption at a Plurality of Consumption Locations].

The present invention relates generally to an apparatus for remote sensing of temperature or of a different physical quantity at a plurality of measurement points, and, more particularly, to a sensing system which uses both pulse interval modulation and at least one of pulse width modulation and pulse amplitude modulation.

Background

An apparatus of this general type is disclosed in German Patent DE-PS 31 28 706, in which there are provided various sensing units, disposed at individual measurement points and connected to a common data bus. At widely spaced intervals, these sensing units send sequential pulses, whose spacing corresponds to the instantaneous value of the parameters to be measured at the measuring points. The pulses generated by the various sensing units are interleaved with each other, which is achieved by triggering or polling the individual sensing units, via a delay line specifically adjusted for each, with a starting pulse generated by the central evaluation unit.

For many applications, it is desirable to be able to transmit from the sensing units to the evaluation unit additional data, e.g. data for identification of the operating characteristic curve of the sensor contained in the sampled sensing unit, data representing a characteristic unit of the sampled sensing unit, and so forth. In principle, these data could also be stored in the central evaluation unit, but in that event, it would be necessary to program the evaluation unit accordingly upon assembly of the entire measuring system and also, later, upon replacement or swapping of sensing units. However, if it were possible to read out these data characteristic of the sensing units directly from the sensing units, it would obviate the necessity for this additional programming, which represents a source of possible errors.

The Invention

Accordingly, it is an object of the present invention to provide an apparatus, for the remote measurement of temperature or another physical parameter at a plurality of measurement points, which can transmit from the sensing units to the evaluation unit information in addition to the actual measurement signal, while retaining a simple two-conductor data bus.

Briefly, this is achieved using both pulse interval modulation and at least one of pulse width modulation and pulse amplitude modulation.

The apparatus of the present invention features a total of two or three interleaved data transmission channels: first, a main data transmission channel for the measurement data, comprising an interval-modulated pulse train, then a second data transmission channel having, in practice, smaller resolution, obtained by modulating the width of the pulses whose intervals are modulated for the main information, and finally, a third data transmission channel, obtained by modulating the amplitude of the pulses whose intervals are modulated for transmission of the measurement data.

By these additional modulation possibilities, one avoids degrading the speed of transmission from the sensing unit to the evaluation unit of the main information, i.e. the instantaneous temperature or instantaneous value of another physical parameter of the sampled sensing unit.

Over the second data channel, one can send secondary information, such as details about the characteristic curve of the sensor installed in the sensing unit (for essentially linear characteristics, e.g. the slope and the origin, or two points on the characteristic from which can be calculated automatic compensation or calibration for deviation of the characteristic due to necessary manufacturing tolerances). Other possible data are details concerning the installation conditions of the sensor at the measuring point or details concerning the current environmental conditions under which the sensor is operating (for temperature measurement in a chemical reactor, e.g. information as to whether the reactor is in the process of being heated or cooled).

Since the evaluation unit must contain circuits which determine the temporal spacing of pulses, and since circuits for determining the width of pulses have a structure very similar to that of circuits for determining spacing of pulses, a remote measurement system according to the invention with two data transmission channels can be achieved with slight additional hardware investment.

If one desires the third data transmission channel, additional circuits in the sensing units for amplitude modulation and additional circuits in the evaluation unit for amplitude discrimination must be provided However, such circuits are not expensive, and these additional costs are more than justified by all the advantages obtained, namely the increased flexibility in data transmission and the savings realized by retaining, unchanged, the existing cable or conductor installation.

The use of a pre-programmed non-volatile memory represents a particularly simple possible way of generating supplemental information about a particular sensing unit sampled. In practice, a plurality of different memory circuits can be provided as plug-in modules, from which assembly workers can select one to match the sensing unit being attached, and simply push it into a base or receiving socket. If the memory circuits bear designations corresponding to their matching sensing units, the assembly workers need not have any knowledge of how to program the evaluation unit.

The use of two kinds of modulation permits transmission to the evaluation unit of a second measurement, in addition to the main measurement, over the additional data transmission channel. For example, main measurement: temperature at measuring point; secondary measurement: viscosity or pressure of a gaseous reaction partner in a chemical reactor in which the temperature is being measured, moisture content of the reaction mixture in this reactor, the quantity of liquid or solid reaction products which have formed in the reactor and which must be periodically removed, the ambient temperature outside the reactor in the factory, details concerning the operating state of a heating or cooling device on the reactor, etc.

The use of a combining circuit for concatenating two digital values is advantageous, in simplifying storage of the various information transmitted from the sensing units to the evaluation unit: one sentence of measurement data and additionally transmitted information can be handled as one word.

The sharing of a frequency-generator driven counter, pair of memories, and subtracting circuit permits a particularly simple construction of the evaluation unit, since a single counter can serve both for determining the interval between sequential pulses and for determining the width of these pulses.

If one applies the principle of additional modulation of pulses carried on the data bus to those pulses sent from the evaluation unit to the individual sensing units as control signals, one can use the width- or amplitude-modulated pulses to control switches which connect subsidiary data buses to the main data bus or disconnect them from it.

Thus, one can connect a great number of sensing units to a single evaluation unit, without fear that large changes in the parameters being measured will cause overlapping of measurement pulses.

The use of different degrees of kinds of modulation assures that the control pulses are inherently distinguishable from the measurement pulses. By itself, the evaluation unit can tell control pulses from measurement pulses because it knows when the former were created. However, differing modulation techniques provide even greater assurance of distinguishing, taking into consideration plant-specific signal run-time effects determined by the installation.

The remote-measurement scheme of the present invention can, in principle, be implemented using either voltage pulses or current pulses. Using current pulses as the measurement pulses, however, permits the data bus itself to act as the power supply for the various sensing units, even if the measurement pulses on the data bus follow each other with minimal spacing.

Using voltage pulses as the measurement pulses facilitates simple discrimination of control pulses, sent from the evaluation unit to the bus switches, from the measurement pulses, sent from the sensing units to the evaluation unit.

DRAWINGS

The invention will be best understood with reference to the accompanying drawings, in which.

DETAILED DESCRIPTION

Figure 1:
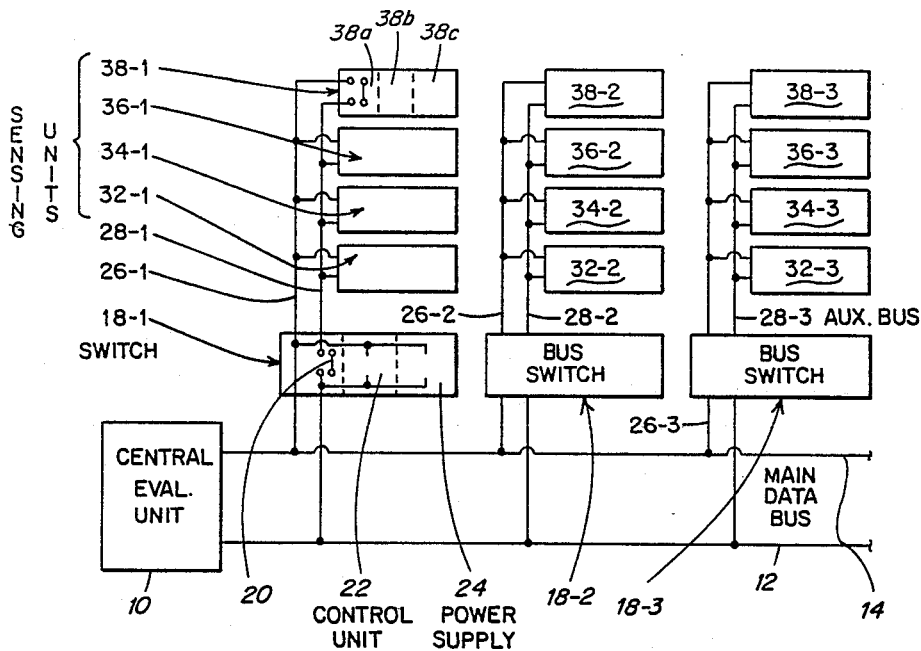
FIG. 1 is a schematic block diagram of a temperature remote-measurement system.

FIG. 1 shows schematically a temperature remote-measurement system, which for ease of understanding is shown in combination with only sixteen measuring points. In practice, such a remote measurement system can readily encompass a thousand and more measuring points.

At a central evaluation unit 10 for all measuring points, two conductors 12, 14 are connected. Conductors 12, 14 form a main data bus. In the embodiment shown, three addressable bus switches 18-1, 18-2, and 18-3 are connected to the data bus. These switches each have a respective breaker 20, which can make or break a connection with conductor 12.

Each breaker 20 is controlled by a respective control unit 22, which receives its control signals from conductors 12, 14. A power supply 24, which provides energy to the various components of a bus switch 18, is also connected to conductors 12, 14.

To each bus switch 18 are connected respective conductors 26, 28. These together form an auxiliary bus, which is either connected to, or disconnected from, the main data bus formed by conductors 12, 14, depending upon the position of breaker 20. To the auxiliary buses formed by conductors 26, 28 are connected sensing units 32–38, which can modulate (as measurement pulses) the current carried by the conductors 26, 28 and which respond to specific voltage pulses (control pulses) generated by the control unit 10 and carried over these conductors. The structure of the sensing units 32–38 will be described in detail below. For now, it is enough to say that each of the sensing units 32–38 has a temperature sensor 39, a pulse generator 40 controlled by the frequency of the sensor output signal, and a switching stage 41 activated by the sensor signal, so that the sensing unit altogether generates a sequence of pulses, whose interval represents the temperature at the sensing unit. Temperature sensors adapted for this application include quartz oscillator sensors with frequency divider circuits connected downstream.

For the purposes of the present application, it is assumed that the sensing units monitor the temperature in an associated chemical reactor (not shown), in which gaseous substances are reacted or processed.

Figure 2A:
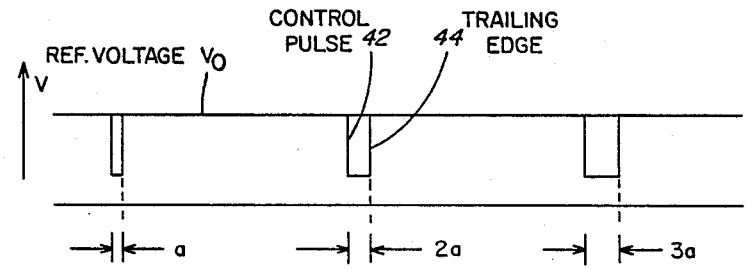
FIGS. 2a and 2b are signal traces of voltage or current versus time on a data bus of the remote-measurement system of FIG. 1.

FIG. 2a illustrates schematically the course over time of the voltage on the conductors 12, 14. The evaluation unit 10 maintains on these conductors a base or reference voltage $V_o$. On this voltage, the evaluation unit superimposes negative control pulses 42, to control the operation of the bus switches 18 and the sensing units 32–38.

The negative control pulses 42 serve as address pulses, by which a respective one of the bus switches 18 is brought into the operating state with closed breaker 20, while the remaining bus switches remain in the open or inactive state. The addressing of a specific one of the bus switches 18 for closing is accomplished by means of the width of the control pulse 42. In the present embodiment, it is assumed that bus switch 18-1 closes in response to a pulse width a, that bus switch 18-2 closes in response to a pulse width 2a, and that bus switch 18-3 closes in response to a pulse width 3a.

Figure 2B:
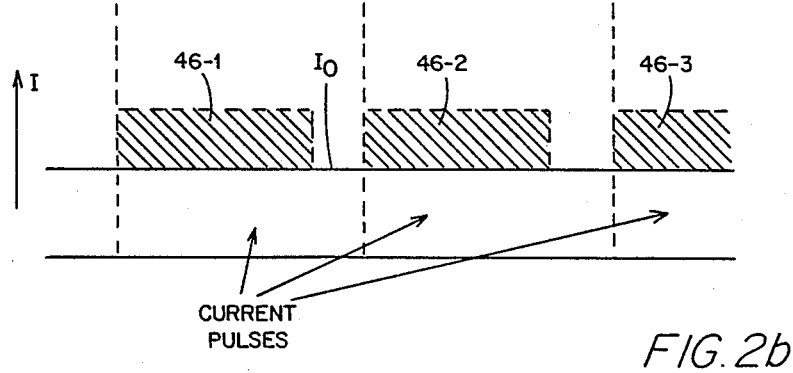

By means of the rising trailing edge or flank 44 of control pulse 42, the evaluation unit 10 further initiates the operation of the various sensing units 32–38 on that auxiliary bus which was addressed by the associated control pulses and connected to the main data bus. Now the various sensing units 32–38 on the auxiliary data bus begin to modulate the base currents $I_o$ which the evaluation unit 10 established on conductors 12,14 (compare FIG. 2b), while unit 10 generates on them sequential current pulses, schematically indicated at 46. The interval between sequential pulses, as generated by a sensing unit, represents the prevailing temperature at this sensing unit.

Typically, the temperature range of frequency-based temperature sensors is relatively small, so that, unless one wants to evaluate the pulse position with very high resolution, one must evaluate pulses separated by greater intervals. In accordance with the invention described in German Patent DE-PS 31 28 706, this is accomplished by connecting a frequency divider downstream of the actual temperature sensor, allowing a relatively large interval, e.g. a half second, between pulses generated by the sensor, and evaluating the phase positions. The time periods, within which a particular one of the sensing units 32–38 is not generating pulses on the current-based data bus, are used for transmitting pulses of other sensing units on the data bus, so that the measurement pulses of the various sensing units are interleaved, as FIG. 3 illustrates.

Figure 3:
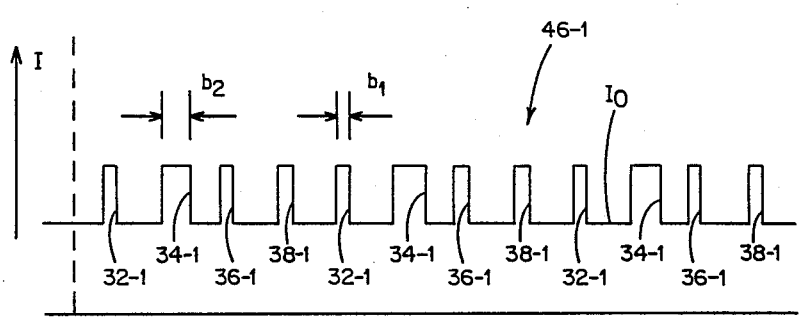
FIG. 3 is a temporally interlaced excerpt of the pulse train of FIG. 2b.

FIG. 3 further illustrates the differing pulse widths which the measurement pulses of the various sensing units have in the present temperature remote-measurement system. In the example shown, sensors 32-1, 36-1, and 38-1 respectively produce positive current pulses of width $b_1$, while sensor 34-2 produces positive current pulses of width $b_2$. In this particular example, a pulse width $b_1$ indicates that a heating device (not shown) of the reactor, with which the sampled sensing unit is associated, is turned on; a pulse width $b_2$ on the other hand indicates that the heating device in question is turned off. Further differing pulse widths can serve to encode the operating condition of a cooling device of the reactor.

The control of temperature or of another physical parameter in the reactor can be accomplished by corresponding encoding of supplemental information in the pulse width of the measurement pulses generated by the sensing units.

The preceding description makes clear that conductors 12, 14 define a main data bus, to which, in the example, one of three auxiliary data buses can be selectively attached. Central evaluation unit 10 receives from sensing units 32–38, with high resolution, main information (relating to the prevailing temperature at the sensing unit, represented by pulse interval modulation) and, with lower resolution, supplemental information (e.g. sensor characteristic curve or operating condition of a heating or cooling device at the measurement point, represented by additional modulation, of the the pulse widths). The corresponding pulse packets of an auxiliary bus are collectively indicated in FIG. $2_b$ as 46.

Figure 4:
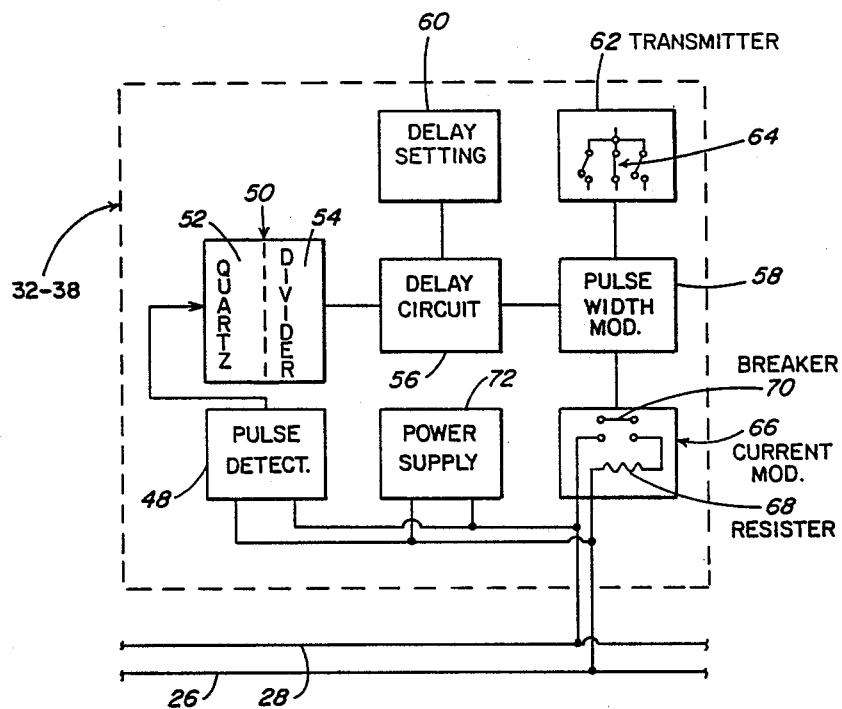
FIG. 4 is a block diagram of a sensing unit of the remote-measurement system of FIG. 1.

FIG. 4 shows details of the structure of one of the sensing units 32–38. These units each have a pulse detector 48 connected to the data lines of the auxiliary bus, which detector receives negative voltage pulses on conductors 26, 28 and passes them on as positive voltage pulses at its output. These voltage pulses serve to start a temperature sensor 50, which comprises a quartz oscillator 52 whose oscillation frequency is a function of its temperature, and a frequency divider 54 connected downstream thereof. The output frequency of the frequency divider is, typically, 4 Hertz (cycles per second). The output signal of the temperature sensor 50, which comprises a train of pulses of predetermined width and temperature-dependent spacing, is passed through an adjustable delay circuit 56 to a pulse-width modulator 58. The magnitude of the signal delay introduced by delay circuit 56 is determined by a delay-setting circuit 60.

Pulse-width modulator 58 modifies the width of the pulses produced by temperature sensor 50, while maintaining their leading pulse edges or flanks, in dependence upon the signal at the modulator's control input. This signal is generated by a transmitter 62, whose output signal corresponds to information to be transmitted to the evaluation unit in addition to that of the sampled sensing unit.

Transmitter 62 can be, for example, a read-only memory (ROM) which transmits a preset signal corresponding to the characteristic curve of the associated temperature sensor 50. This signal can encompass multiple information components, e.g. zero-crossing shift, slope and curvature of the characteristic or several characteristic points of the curve.

In connection with temperature measurement in a chemical reactor, transmitter 62 can generate a signal associated with the capacity setting of the reactor heater or reactor cooler, or a signal associated with another secondary measured parameter.

Transmitter 62 can also comprise an analog or digital sensor or can have, instead of a semiconductor fixed memory (ROM), a bank of switches 64 or a simple switch. Pulse width modulator 58 is matched to the output signal of transmitter 62, e.g. when a sensor producing an analog voltage signal is used, the modulator 58 has a voltage-controlled monostable flip-flop, which is triggered by the pulses given off by delay circuit 56.

The output signals of temperature sensor 50, their width modified by width modulator 58, control a current modulation circuit 66 connected to the auxiliary data bus. Circuit 66 may comprise, for example, a resistor 68 and a serially connected breaker 70. Breaker 70 is normally open and is closed by an activating pulse from modulation circuit 66, which closing leads to a positive current pulses on the auxiliary data bus and thence on the main data bus.

A power supply circuit 72 serves for tapping off a supply of energy for the various components of the sensor from the base current $I_o$ maintained by evaluation unit 10.

Figure 5:
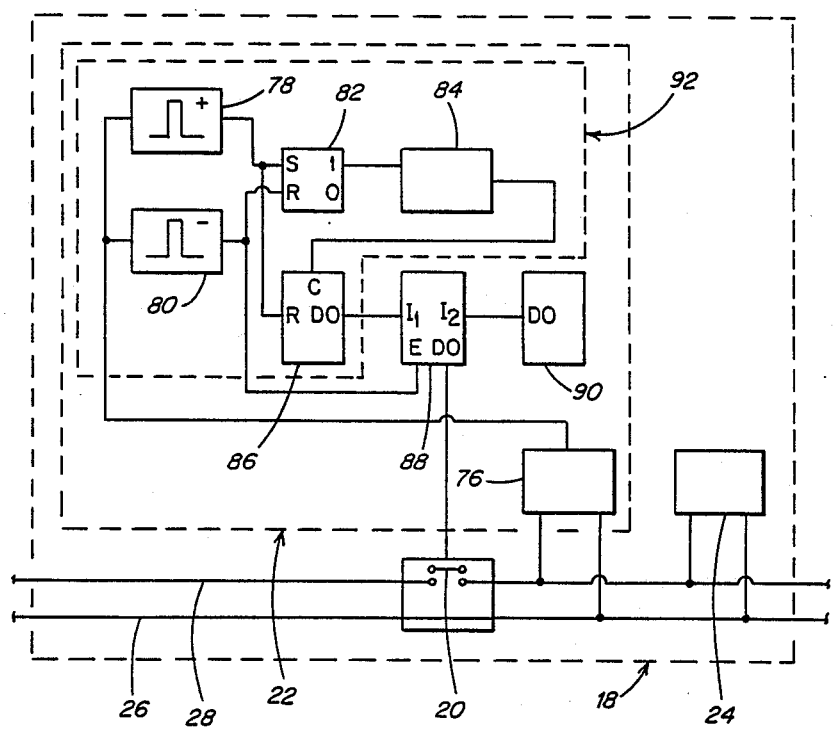
FIG. 5 is a block diagram of an addressable bus switch of the remote-measurement system of FIG. 1.

FIG. 5 shows details of a bus switch.

Each bus switch 18 has a pulse detector 78, constructed similarly to pulse detectors 48 of the sensing units, which also responds to negative voltage pulses and inverts them into positive voltage pulses of identical length. These positive pulses are applied to both a rising-edge-triggered flank detector 78 and a falling-edge-triggered flank detector 80. Their output signals are applied respectively to the SET and the RESET inputs of a bistable flip-flop 82. Its "1" output serves to trigger a free-running frequency generator 84. The output pulses of generator 84 are applied to the count input C of a counter 86, whose RESET input R is connected to the output of flank detector 78.

The output signal of the falling-edge-triggered flank detector 82 not only resets bistable flip-flop 82, thus ending the generation of pulses by frequency generator 84, but also is applied to a comparator 88, which also receives the output signal of counter 86 and the output signal of an address-setting circuit 90. If the output signals of counter 86 and of adjustment circuit 90 agree, one obtains at the output of comparator 88 a control signal which causes breaker 20 to close. In this case, the conductors 26, 28 of the auxiliary data bus connect with conductors 12, 14 of the main data bus.

Bus switch 18 further contains the previously mentioned power supply circuit 24 which taps off from the base current $I_o$ the energy needed for operation of the various components.

In FIG. 5, the components 78–86, which collectively form a pulse width discriminator, are surrounded by a dashed line 92.

Figure 6:
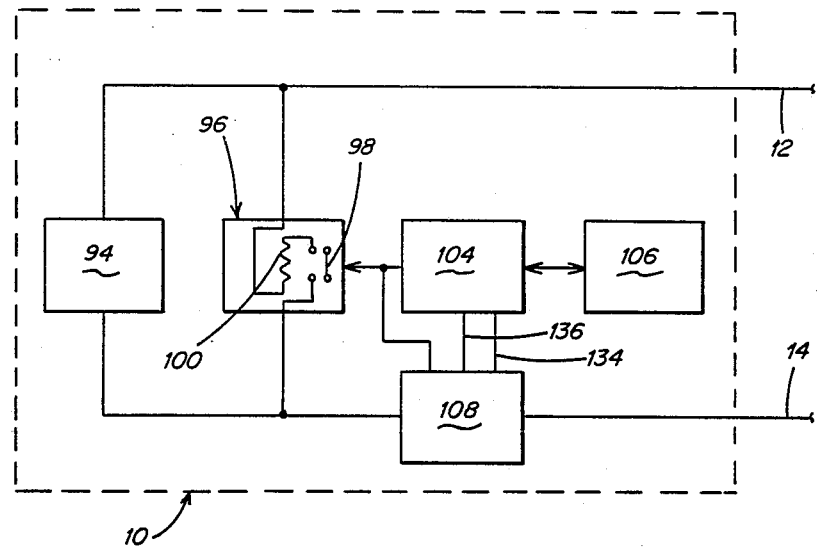
FIG. 6 is a block diagram of an evaluation unit of the remote-measurement system of FIG. 1.

As FIG. 6 shows, evaluation unit 10 contains, first, a voltage source 94 for establishment of the base current $I_o$ on main data bus 12,14 and on whichever auxiliary data bus is connected at a given time. A control pulse generator 96 is connected to the inputs of voltage source 94. Generator 96 preferably comprises a resistor 100 and a normally-open breaker switch 98, the latter of which closes when triggered by a signal on the control input of the control pulse generator 96, in order to sumperimpose a negative voltage pulse on the base voltage $V_o$.

The internal resistance of voltage source 94 is small relative to the short-circuit resistance 68 of the sensing units and large relative to the short-circuit resistance 100, so that the closing of breaker 70 causes a current pulse on the main data bus, and the closing of breaker 98 causes a voltage pulse on main data bus 12, 14.

The control signals for control pulse generator 96 are generated by a freely programmable processor 104, which co-operates with a mass storage memory device 106 and which is loaded with a program which controls the sequence of switching on the various auxiliary buses, the triggering of the measurement pulse packets, and their evaluation and storage. Thus, processor 104 applies, for example, pulses with respective lengths a, 2a, 3a, in order to connect the various auxiliary data buses to the main data bus in any desired sequence. The free programmability of addressing of the bus switches makes it possible to less frequently interrogate those of the auxiliary data buses which are of less interest than the others of the auxiliary data buses.

The falling trailing flank of a pulse applied by the processor 104 to the control pulse generator 96 starts an evaluation circuit 108, which is disposed in the current loop of voltage source 94, main data bus, and switched-on auxiliary data bus. Details of evaluation circuit 108 will be further described below with reference to FIG. 7.

Evaluation circuit 108 contains, on the data bus, a pulse detector 110, which only responds to positive current pulses, and, upon receiving one, generates at its output a positive voltage pulse. This is applied to the inputs of a positive edge-triggered flank detector 112 and the inputs of a negative edge-triggered flank detector 114.

The output signal of the flank detector 112 controls the write-control-input EW (Enable Write) of a write/read memory 116. The data input DI of this write/read memory 116 is connected to the data output DO of a counter 118, whose count input C is continously supplied with count pulses by a free-running frequency generator 120. The RESET input of counter 118 is triggered by the evaluation-start signal generated by the processor 104.

The data output of counter 118 is further connected with the data input DI of a second write/read memory 122, whose Enable Write input EW is triggered by the the output signal of the negative-edge-triggered flank detector 114.

The data output terminals DO of both write/read memories 116 and 122 are connected with the inputs of a subtraction circuit 124. The output signal of flank detector 114 passes through a delay element 126 and serves to control the Enable Readout terminals ER of both write/read memories. The output signal of delay element 126 is further delayed b passage through a further delay element 128 and serves to activate the subtraction circuit 124. The output signal of subtraction circuit 124 corresponds to the width of a negative current pulse on the data bus detected by pulse detector 110, while the contents of write/read memory 116 corresponds to the position of the rising edge or flank of this pulse.

These two pieces of information are concatenated by a combining circuit 130, not arithmetically, but in the form of a symbol chain: the output signal of the write/read memory 116 goes into the higher-order bits of, for example, a 16-bit data word, while the output signal of the subtraction circuit is placed in the lower-order bits of this data word.

The activation of the combining circuit 130 is accomplished by the output signal of delay element 128, after passage through a further delay element 132. The output signal of delay element 132 is simultaneously furnished over a line 134 to processor 104, to indicate that an additional measurement data word is ready to be received and further processed. This word is transmitted from combining circuit 130 over a data line 136 to processor 104.

In order that the write/read memory 116 places its content on its data output terminal DO both upon activation of subtraction circuit 124 and upon activation of combining circuit 130, memory 116's input terminal ER is connected to the output of an OR-gate 138, to whose inputs are applied the outputs of both delay element 126 and delay element 128.

Analogously to the circuits previously described, evaluation circuit 108 further contains a power supply circuit 140 for tapping off supply voltage from the base current $I_o$.

By means of the evaluation circuit 108, both the position of a measurement data pulse and its pulse length can be determined by reading out the state of the single counter 118, at respective points in time. One could modify this embodiment by using counter 118 only for specifying the position of a measurement data pulse, and could obtain the pulse's width with a specialized pulse width discriminator, of the kind shown in FIG. 5 as element 92. Then, by setting of the operating frequency of the free-running frequency generator 84 of such a pulse width discriminator, the resolution with which the pulse width is specified could be selectively varied from the time resolution with which the pulse position is specified.

Figure 8:
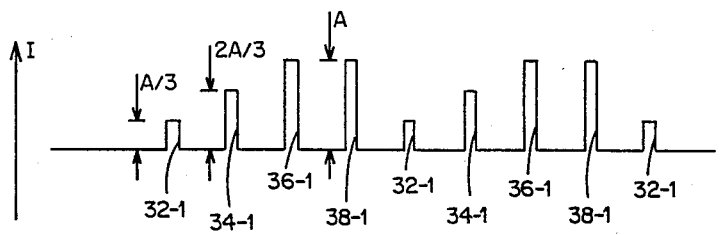
FIG. 8 is a signal-trace illustration similar to FIG. 3 in a modified temperature remote-measurement system.

In the above-described embodiment, the supplemental information to be transmitted from the sensing units to the central evaluation unit was encoded in the width of the interval-modulated pulses carrying the main information (temperature). FIG. 8 illustrates how one can also encode this supplemental information as an amplitude modulation of the interval-modulated pulses carrying the main information.

In the pulse train shown in FIG. 8, the sensing units 32-1 through 38-1 transmit supplmental information, which can be designated "1", "2", and "3", i the form of pulse amplitudes of magnitudes A/3, 2A/3, and A. These different pieces of supplemental information can, again, be used for various values of the characteristic curve of the installed temperature sensor or for other secondary measurement information.

Figure 9:
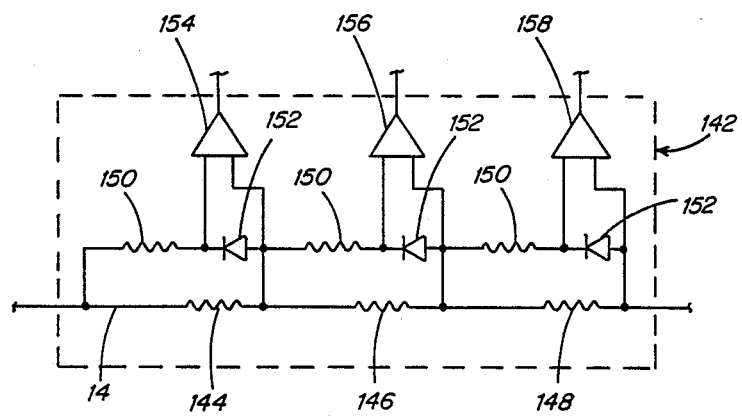
FIG. 9 is a diagram of an amplitude-discriminator circuit which could also be provided within the discriminator unit of FIG. 7.

FIG. 9 shows an amplitude discriminator 122, which can be provided in the evaluation circuit 108 for recognition of three different pulse heights.

In conductor 14 are connected three resistors 144, 146, 148 whose values are in the ratios one to two to three. In parallel to each of resistors 144-148, a respective series circuit of a resistor 150 and a zener diode 152 is connected. The voltage drop across each of the respective zener diodes 152 is applied to the pair of inputs of a respective differential amplifier 154, 156, 158, which generates an output signal when the current pulse reaches the level A/3, 2A/3, or A shown in FIG. 8. If desired, a decoder network can additionally be connected downstream of the amplitude discriminator 142 of FIG. 9, which would translate the collective signal defined by the output signals of differential amplifiers 154 through 158 into the numbers "1", "2", and "3".

The amplitude modulation of the measurement data pulses, as shown in FIG. 3, can also be combined with the pulse width modulation of FIG. 3, thereby opening two supplemental information channels on the data bus, by means of which two low-resolution pieces of supplemental, measurement-relevant, information can be furnished from the sensing units 32-38 to the evaluation unit 10. For this purpose, the amplitude discriminator 142 would be inserted in FIG. 7 as shown by the dashed box. The combining circuit 130 would then use the output signal of the amplitude discriminator 142 to form a further part of the measurement data word carried over the data line 136 to processor 104.

Figure 7:
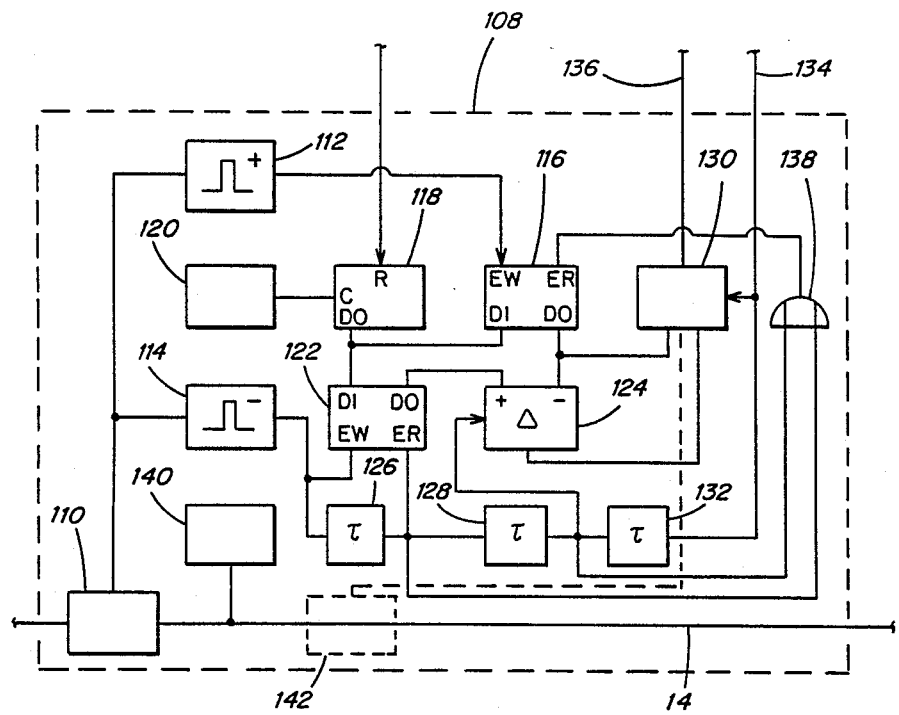
FIG. 7 is a diagram of a circuit for determining the interval between, and the width of, the pulses transmitted over the data bus of the remote-measurement system of FIG. 1, and for assembling the corresponding measurement values into a single data word.

If desired, the evaluation circuit of FIG. 7 could be modified to omit the circuit which determines the pulse width, and to provide only a supplemental data transmission channel operating by amplitude modulation on the data bus (dashed addition to FIG. 7).

Those skilled in the art will appreciate that numerous modifications are possible within the scope of the inventive concept, and that any of the embodiments described could be used in combination with other embodiments. Accordingly, the invention is not restricted to the particular embodiments shown and described, but rather is defined by the appended claims.

We claim:

1. Dual-channel modulation system, for remote measurement of a physical parameter at a plurality of measurement points, having
   a central evaluation unit (10);
   a plurality of sensing units (32-38);
   data bus means (12, 14; 26, 28) interconnecting said evaluation unit and said sensing units;
   each of said sensing units (32-38) comprising a first sensor (52) associated with a respective one of said measurement points, a first modulation circuit (54) connected to the output of said sensor and generating a pulse-interval-modulated signal, representing a first data channel, and a phase modulator (60), for the pulses generated, each respective modulator being adjusted differently for each of said sensing units (32-38),
   wherein,
   each sensing unit further comprises at least one additional modulation circuit (58) having an input for a control signal (62) and modulating at least one of the width and amplitude of said pulses, as a function of said control signal (62), thereby providing a second data channel.

2. System according to claim 1, wherein each sensing unit further comprises
   fixed memory means containing data specific to at least one of said sensor (52) and its associated measurement point, and signal generation means providing said control signal (62) to said at least one additional modulation circuit (58) as a function of said specific data.

3. System according to claim 1, wherein each sensing unit further comprises
   a second sensor responsive to a different physical parameter than said first sensor, and generating said control signal (62 as a function of said different physical parameter.

4. System according to claim 3, wherein said first sensor is responsive to temperature at a first measurement point and said second sensor is responsive to temperature at a second measurement point spaced therefrom.

5. System according to claim 3, wherein said first sensor is responsive to temperature at a first measurement point and said second sensor is responsive to at least one of the rate of material flow and the quantity of material flow adjacent to said first measurement point.

6. System according to claim 1, wherein said central evaluation unit (10) comprises
   a pulse-interval discriminator circuit (112-120) and at least one of a pulse-width discriminator circuit (114-122) and a pulse-amplitude discriminator circuit (142).

7. System according to claim 6, further comprising means (130) responsive to a trailing edge of a pulse for concatenating a digital value, representative of a pulse interval, and a digital value, representative of at least one of pulse width and pulse height, into a single data word.

8. System according to claim 6, further comprising (FIG. 7)
   a free-running frequency generator (120);
   a counter (130) connected to an output of said frequency generator;
   a first memory (116) and means responsive to a leading edge of a pulse for reading the then-current state of said counter (130) into said first memory (116);
   a second memory (122) and means responsive to a trailing edge of a pulse for reading the then-current state of said counter (130) into said second memory (122); and
   a subtracting circuit means (124) having a first input and a second input connected respectively to said first (116) and second (122) memories, and means responsive to a trailing edge of a pulse for determining the difference between the respective count values stored in said memories.

9. System according to claim 8, wherein said central evaluation unit (10) includes said pulse-width discriminator circuit (114-122), and
   said subtracting circuit means (124) operates as part of both said pulse-interval discriminator and said pulse-width discriminator.

10. System according to claim 1, wherein said said bus means comprises a main data bus (12, 14) and a plurality of auxiliary data buses (26–30);
and further comprising
a plurality of addressable bus switches (18), each disposed between said main data bus and a respective one of said auxiliary data buses (26–30), and responsive to at least one of a pulse-width-modulated control signal and a pulse-amplitude modulated control signal (42) from said central evaluation unit (10) for selecting a single auxiliary data bus for connection to said main data bus.

11. System according to claim 10, wherein said phase modulators (60) are all disposed on respective ones of said auxiliary data buses, and their respective phase settings differ along a particular auxiliary data bus, but among all the modulators, at least some modulators have the same phase settings, their respective auxiliary data buses not being connected simultaneously to said main data bus.

12. System according to claim 10, wherein
said control signals (42) are modulated according to a different modulation scheme than said measurement pulses (46).

13. System according to claim 1, wherein said measurement pulses (46) generated by said sensing units (32–38) are current pulses.

14. System according to claim 1, wherein said measurement pulses (46) generated by said sensing units (32–38) are voltage pulses.

15. System according to claim 1, wherein at least one of said sensing units (32–38) contains a sensor (52) which is a quartz oscillator whose output frequency is temperature-dependent.

* * * * *